United States Patent Office 3,501,548
Patented Mar. 17, 1970

3,501,548
DEHYDROGENATION
George J. Nolan, Elliott P. Doane, and Robert J. Hogan, Bartlesville, Okla., assignors to Phillips Petroleum Company, a corporation of Delaware
No Drawing. Filed Feb. 19, 1968, Ser. No. 706,617
Int. Cl. C07c 5/18; B01j 11/78, 11/82
U.S. Cl. 260—680                    10 Claims

ABSTRACT OF THE DISCLOSURE

Dehydrogenation process using a catalyst formed from a phosphorus-containing compound such as phosphoric acid, a tin compound such as tin chloride, and at least one of a Group VI–B metal or Group VI–B metal-containing compound.

This invention relates to a new and improved dehydrogenation catalyst and a dehydrogenation process using that catalyst.

Heretofore, oxidative dehydrogenation catalysts have been formed from phosphoric acid and tin oxide.

It has now been found that improved dehydrogenation catalysts can be formed from phosphoric acid or a phosphate as hereinafter defined, a tin compound, and at least one of chromium, molybdenum, tungsten, and compounds containing such metals as hereinafter defined.

The improved catalysts of this invention are more active over a longer period of time than similar catalysts not containing the Group VI–B metal so that by employing the catalysts of this invention longer dehydrogenation runs can be employed and the average feed conversion for a given dehydrogenation run will be higher.

The products of the process and catalyst of this invention are unsaturated compounds such as butadiene, isoprene, styrene, and 2-methyl-5-vinylpyridine, which are all useful as monomers for polymerization processes to make useful materials such as rubber for pneumatic tires, polystyrene which can be formed into articles such as tumblers, and the like.

Accordingly, it is an object of this invention to provide a new and improved dehydrogenation catalyst and method.

It is another object of this invention to provide a new and improved catalyst useful in oxidative dehydrogenation processes.

Other aspects, objects and the several advantages of this invention will become apparent to one skilled in the art from a study of this disclosure, and the appended claims.

By this invention, a catalyst is formed from the combination of an ammonium and/or alkali metal and/or alkaline earth metal phosphate and/or phosphoric acid, at least one tin compound as hereinafter defined, and at least one of chromium, molybdenum, tungsten, and compounds containing those metals as hereinafter defined, each component being combined with the other in amounts to form a final composition effective as a catalyst for dehydrogenation processes.

Substantially any phosphorus, tin, and Group VI–B metal containing compounds can be employed in the catalyst so long as at least one of the compounds used contains oxygen, none of the compounds is deleterious to the dehydrogenation catalytic effects, and all the elements in the compounds used other than phosphorus, tin, oxygen, and Group VI–B metals are substantially volatilized by heating the catalyst to at least the temperature at which the catalyst is used, e.g., at least 700° F., and below the decomposition temperature of the catalyst, or are removed by washing the catalyst with a liquid such as water.

Suitable phosphorus-containing compounds include phosphoric acid, phosphorus pentoxide, the phosphorus halides, the ammonium phosphates, and the Group I–A and II–A metal posphates such as lithium phosphate, monobasic sodium phosphate, dibasic potassium phosphate, rubidium phosphate, monobasic cesium phosphate, magnesium phosphate, dibasic calcium phosphate, and the like. The term "phosphate" is intended to include not only the monophosphate ion, $PO_4^{-3}$, but also polyphosphate ions, $(P_nO_{3n+1})^{-(n+2)}$ and $[P_nO_{3n-1}(OH)_2]^{-n}$, in which $n$ is an integer in the range of 2 through 100.

The periodic table used in the description of the catalysts of the invention is that published in Handbook of Chemistry and Physics, published by Chemical Rubber Company, 45th edition (1964), page B–2.

The tin compound or compounds employed include any such compound soluble or dispersable in water, alcohol, or ether and include both stannous or stannic compounds. Representative examples of suitable tin compounds are, for sake of brevity, given only as the stannic compound but it is to be understood that the corresponding stannous compound is equally as applicable. Representative examples include stannic halides (stannic fluoride, stannic chloride, stannic bromide, stannic iodide), stannic sulfate, stannic acetate, stannic oxide, stannic tartrate, and stannic nitrate.

Besides elemental chromium, molybdenum, and tungsten, compounds containing these metals that can also be employed include the nitrates, the halides, the sulfates, the oxalates, the acetates, the carbonates, the propionates, the tartrates, the bromates, the chlorates, the oxides the hydroxides, and the like.

The phosphorus-containing compound or compounds, the tin-containing compound or compounds, and the Group VI–B metal or metal-containing compounds can be combined in any conventional manner which will yield catalytic combinations suitable for conventional dehydrogenation processes. For example, the catalyst components can be combined using a coprecipitation technique as disclosed in detail hereinafter in the specific examples, by conventional aqueous or nonaqueous solution or suspension mixing, by ion exchange, by simply mixing the components by themselves without the use of additional dispersants or solvents, and the like, including combinations of these techniques.

Generally, the catalysts can be formed by mixing the components for periods varying from about 1 minute to about 5 hours in the presence or absence of a solvent or dispersant, at temperatures from about ambient, i.e., about 60° F., up to about 200° F. Ambient, sub-ambient, or super-ambient pressures, and ambient or inert atmospheres such as nitrogen, and the like can be used.

Suitable solvents or dispersants that can be employed for the combining of the catalyst components include water, alcohol, or ethers for the step of combining the tin compound and phosphorus compound, and these solvents as well as hydrocarbons, halogenated hydrocarbons, ketones, esters, and the like for any other steps of the catalyst preparation.

The catalyst itself when finished and in a condition for use in a dehydrogenation process such as an oxidative dehydrogenation process will contain from about 0.1 to about 16 weight percent phosphorus, from about 15 to about 75 weight percent tin, and from about 1 to about 10 weight percent Group VI-B metal, all weight percentages being based on the total weight of the final catalyst.

The tin and Group VI-B metals present in the final catalyst are believed to be primarily present therein as oxides, phosphates, and/or combinations thereof, the total amount of tin plus Group VI-B metal present in the final catalyst preferably being in the range of from about 31 to about 76 weight percent based upon the total weight of the final catalyst.

The total amount of phosphorus, tin, and Group VI-B metal present in the final catalyst is less than 100 percent of the catalyst, e.g., from about 10 to about 40 weight percent less based on the total weight of the final catalyst, the difference between the total and the 100 percent being substantially combined oxygen in sufficient amounts to satisfy the valence requirements of the Group VI-B metal, tin, and phosphorus.

A presently preferred method of making the catalyst of this invention is to mix solution or suspensions of, for example, the phosphates and/or phosphoric acid, one or more tin compounds, one or more Group VI-B metals or compounds, and at least one of ammonia, ammonium hydroxide, sodium hydroxide and potassium hydroxide, filter, wash to remove any undesirable electrolytes, dry, and calcine. A particle-forming step such as pelletizing or screening can precede or follow the drying step or calcining step.

The concentration of the various solutions that can be used to make the catalyst can vary widely, e.g., from about 0.01 to about 10 molar or more, depending on the solubility of the particular materials employed. It presently appears that any order of mixing can be used, and the final pH of the mixture can generally be in the range of from about 2 to about 7, preferably from about 3.5 to about 6.5. The precipitate that forms is separated from the liquid by any conventional means such as filtration. Thereafter the precipitate is washed with dilute aqueous ammonium salt solutions such as ammonium acetate, ammonium nitrate, ammonium sulfate, and the like, and/or with deionized water to remove electrolytes. The washed precipitate is then dried for from about 2 to about 24 hours at temperatures of from about 100 to about 300° F. in air or in inert atmosphere such as nitrogen. The dried precipitate is then calcined from about 1 to about 24 hours at from about 1000 to about 1500° F., preferably at about the temperature at which the catalyst is to be used in the dehydrogenation process, under ambient or inert atmospheres. The drying and calcining steps remove water and other volatile materials from the catalyst, thus preshrinking the catalyst so that it will not shrink further when used in the dehydrogenation process, and also serve to activate the catalyst. As mentioned before, the particle-forming step can precede or follow the drying or calcining step. The dried and calcined catalyst is preferably formed into $1/16$- to $1/2$-inch pellets by compression molding or extrusion, or is simply screened to a desired size, such as 20–28 mesh (Tyler Sieve Series, Mechanical Engineers Handbook, by L. S. Marks, 4th edition, McGraw-Hill Book Co., Inc., New York, N.Y., 1941, p. 836). Optimally, a particulate tin/phosphorus/oxygen material is formed, and the Group VI-B metal containing compound or compounds is added by, for example, impregnation followed by drying.

The catalyst of this invention can be used in any conventional dehydrogenation, particularly oxidative dehydrogenation, process using conventional procedures and techniques. Suitable oxidative dehydrogenation processes are those which dehydrogenate at least one material selected from the group consisting of alkenes, cycloalkenes, alkylpyridines, and alkyl arommatics, using an elevated temperature, and a molecular oxygen-containing gas, with or without the presence of steam. The alkenes can contain from 3 to 10, preferably 4 to 6, carbon atoms per molecule, inclusive, and the cycloalkenes can contain from 4 to 10, preferably 4 to 6, carbon atoms per molecule, inclusive. The alkyl pyridines and alkyl aromatics can contain from 1 to 4, preferably 1 to 2, alkyl groups per molecule which themselves contain from 1 to 6, preferably 4 to 6 carbon atoms per group, inclusive, with at least one alkyl group having at least 2 carbon atoms.

Examples of suitable materials include propylene, n-butenes, n-pentenes, isopentenes, octenes, decenes, and the like. Also included are alkyl-substituted and unsubstituted cycloalkenes such as cyclobutene, cyclopentene, cyclohexene, 3-isopentylcyclopentene, and the like. Other materials include ethylbenzene, propylbenzene, n-butylbenzene, isobutylbenzene, hexylbenzene, 1-methyl-2-propylbenzene, 1-butyl-3-hexylbenzene, and the like. Still other materials include ethylpyridine, 2-methyl-5-ethylpyridine, 2,3,4-trimethyl-5-ethylpyridine, 2-ethyl-5-hexylpyridine, and the like.

Preferred reactions applicable to this invention are the formation of 1,3-butadiene from butenes, 1,3-pentadiene from pentenes, isoprene from methylbutenes, styrene from ethylbenzene, and 2-methyl-5-vinylpyridine from 2-methyl-5-ethylpyridine.

The catalyst of this invention can be used in the form of granules, mechanically formed pellets, or any other conventional form for a catalyst. The catalysts can also be employed with suitable supporting or diluting materials such as alumina (preferably, eta or gamma or mixtures thereof), boria, beryllia, magnesia, titania, zirconia, silica, or mixtures such as alumina-boria, silica-alumina, and the like, and similar conventional materials known in the art. They can be used in fixed or fluid bed operations.

The amount of catalyst employed will vary widely depending on the materials present and the conversion and selectivity desired, but generally the amount will be that which, for the given reaction, is an effective catalytic amount to produce the desired dehydrogenation results.

The molecular oxygen-containing gas employed in oxidative dehydrogenation can be present as such or with inert diluents such as nitrogen and the like. Suitable molecular oxygen-containing gases include air, flue gases containing residual oxygen, and any other conventional gas of a similar nature. Pure or substantially pure oxygen can also be employed if desired.

The operating conditions for the process of this invention can vary widely but will generally include a temperature from about 700 to about 1300° F., preferably from about 800 to about 1200° F.; a pressure from about 0.05 to about 250, preferably from about 0.1 to about 25 p.s.i.a.; if used, an oxygen to gaseous organic compound feed volume ratio of from about 0.1/1 to about 3/1, preferably from about 0.5/1 to about 2/1; and, if used, a steam to organic compound feed volume ratio of 0.1/1 to 50/1, preferably 5/1 to 20/1. The organic compound feed space rate (volumes organic compound vapor/volume of catalyst/hour, 32° F., 15 p.s.i.a.) can be from about 50 to about 5000, preferably from about 100 to about 2500.

The process of this invention is ordinarily carried out by forming a mixture, preferably preheated, of organic compound feed; steam, if used; and oxygen and/or oxygen-containing gases, and passing this mixture over the catalyst at the desired temperature. Recycle of unconverted organic compound feed can be employed if desired; however, the conversion rates and selectivity of this invention are generally sufficiently high to justify a single pass operation, if, for example, the product streams can be used without separation steps in a subsequent operation, such as polymerization.

The catalysts of the invention operate for long periods of time, but when regeneration is necessary it can be effected simply by discontinuing organic compound flow for a short period.

The catalyst tests in the examples were made using 20-28 mesh (Tyler Sieve Series) catalyst granules.

EXAMPLE I

Catalyst preparation

*Catalyst 1.*—Tin chloride of the formula $SnCl_4 \cdot 5H_2O$ in the amount of 46.5 pounds was dissolved in 13 liters of deionized water. Eight gallons of aqueous ammonia (28 weight percent ammonia) was diluted with eight gallons of deionized water. The solution of tin chloride and the solution of ammonia were added to 13 gallons of deionized water over a 27-minute period, the addition rate of the ammonia solution being controlled so as to maintain the resulting mixture at a pH of 5. About 15 gallons of the ammonia solution was used in making the final mixture. After one hour of stirring the suspension at about 90° F., the suspension was filtered and the precipitate washed four times with a solution formed by dissolving 6.5 pounds of ammonia nitrate in 20 gallons of deionized water. The precipitate was then washed twice with a solution formed by dissolving 1.5 pounds of ammonia nitrate in 20 gallons of deionized water. After the filtration, it was determined that the wet gel remaining contained 38 weight percent tin oxide in the form of $SnO_2$. To a 4470-gram portion of this wet gel, 316 grams of 85 weight percent phosphoric acid was added with rapid stirring at 90–100° F. over a 30-minute period. The resulting material was then air dried for two days at 80° F. and calcined one hour at 1100° F. in an air atmosphere. In reaching the calcining temperature of 1100° F., the temperature was gradually increased to 1100° F. at the rate of 5° F. per minute. The calcined material was then ground to about 6 mesh (Tyler Sieve Series). The final phosphorous content of the calcined material was 5 weight percent and the final tin content was 69 percent, both weight percentages being based on the total weight of the final calcined material.

*Catalyst 2.*—Sufficient ammonium meta-molybdate to give 0.5 weight percent molybdenum in the final catalyst was dissolved in sufficient water to just wet a 15-gram portion of catalyst 1 and the aqueous ammonium meta-molybdate liquid was then added to a 15-gram portion of catalyst 1. The resulting mixture for 5–10 minutes at 90–100° F., dried 12 hours in air at 320° F. and then calcined 2 hours in air at 1100° F.

*Catalyst 3.*—This catalyst was prepared in the same manner as catalyst 2 except that ammonium meta-tungstate was employed instead of ammonium meta-molybdate.

*Catalyst 4.*—Tin chloride in the form of $SnCl_4 \cdot 5H_2O$ and in the amount of 904 grams was dissolved in 1600 milliliters of deionized water and filtered. An aqueous phosphoric acid solution containing 85 weight percent phosphoric acid and in the amount of 550 grams was neutralized with aqueous ammonia (28 weight percent ammonia) to give a resulting solution having a pH of 6.8. These solutions of tin chloride and phosphoric acid were added substantially simultaneously to 1000 milliliters of deionized water. The deionized water was initially heated to 180° F. and thereafter maintained at temperatures in the range of 120 to 140° F. during the period when the tin chloride and phosphoric acid solutions were added to the water. The pH of the final mixture was 0.9. The precipitate in this final mixture was washed five times by diluting to 3500 milliliters with deionized water and filtering to apparent dryness. A portion of the remaining filtrate was dried 24 hours in air at 150° F. and calcined 2 hours in air at 1100° F. The final tin and phosphorus contents in the calcined filtrate were 43 and 17.7 weight percent, respectively, based on the total weight of the calcined material.

*Catalyst 5.*—A portion of the undried material of catalyst 4 equivalent to 40 grams of dry material was mixed with 100 milliliters of 2 normal-chromic nitrate dissolved in water and allowed to stand 24 hours in air at 80° F. Excess chromic nitrate not held by ion exchange was removed by washing the resulting gel with copious amounts of deionized water. The resulting material was dried 24 hours in air at 150° F. and calcined 2 hours in air at 1100° F. The resulting material had a chromium content of 2 weight percent based upon the total weight of the calcined material.

The above five catalysts were tested in a dehydrogenation process wherein butene-2 was dehydrogenated to butadiene at feed, air, and steam space velocities of 200, 1000 and 2400 volumes per volume of catalyst per hour at 32° F. and 15 p.s.i.g., respectively. The dehydrogenation process was carried out at atmospheric pressure and a furnace temperature of 1000° F. Butene-2 conversion (conv.) and butadiene selectivity (selec.) both in mols per 100 mols of butene-2 in the feed, were determined for catalysts 4 and 5 after 15 minutes, and 180 minutes on stream. For catalysts 1 through 3, the butene-2 conversions and butadiene selectivity were measured initially and after three hours on stream. After 3 hours on stream, each of catalysts 1 through 3 was operating at a butadiene selectivity of about 79 mol percent. From these measurements the decrease in conversion was calculated.

The butene-2 conversion and butadiene selectivity values were determined by gas-phase chromatography.

The results for catalysts 1–3 were as follows:

TABLE I

| Catalyst No. | Decrease in butene conversion, percentage points |
|---|---|
| 1 | 26 |
| 2 | 20 |
| 3 | 23 |

Thus, it is clear that catalysts 2 and 3 which contain molybdenum and tungsten, respectively, showed a lesser decrease in butene conversion after three hours on stream, which shows that the catalyst was more active for a longer period of time.

The results for catalysts 4 and 5 were as follows:

TABLE II

| Catalyst | 15 minutes | | 180 minutes | |
|---|---|---|---|---|
| | Conv. | Selec. | Conv. | Selec. |
| 4 | 8.5 | 98 | 5.5 | 98 |
| 5 | 33 | 93 | 37 | 91 |

From the above Table II, it can be seen that catalyst 5, which contained chromium, was considerably more active catalytically speaking and actually gave an increase in conversion rate after 180 minutes on stream whereas catalyst 4 gave a decrease in conversion rate after 180 minutes on stream.

EXAMPLE II

Catalyst preparation

*Catalyst 6.*—A tin-containing solution was prepared by dissolving 2040 grams of $SnCl_4 \cdot 5H_2O$ in a solution containing 1 liter of 96 weight percent sulfuric acid and 327 grams of 85 weight percent phosphoric acid in deionized water such that the total volume was 10 liters. An ammonia solution was prepared by mixing 4 liters of concentrated ammonium hydroxide (29 weight percent $NH_3$) and 1 liter of deionized water. These two solutions were added simultaneously, with rapid stirring, over a 20-minute period, to 4 liters of deionized water containing 660 grams of ammonium sulfate, at a temperature of 90–100° F. The pH varied from 3 to 6 during the mixing operation, and the final pH was 4.3. The wet gel was filtered and washed once with 10 liters of deionized water containing sufficient sulfuric acid to give a pH of 4.5. The wet gel contained about 20 weight percent solids. For testing, it was dried over the weekend at 212° F. in air in a vacuum oven and calcined 3 hours in air at 1100° F. It contained about 63 weight percent tin and 7.7 weight percent phosphorus, respectively, based on the total weight of the calcined material.

*Catalyst 7.*—A molybdenum-containing solution was prepared by dissolving 0.9 gram of ammonium metamolybdate in 150 ml. of deionized water. This solution was mixed 5–10 minutes at 90–100° F. with 250 grams of catalyst 6 wet gel. The mixture was dried 24 hours at 212° F. and 16 hours at 302° F. in air in a vacuum oven and calcined 2 hours in air at 1100° F. It contained about 1 weight percent molybdenum based on the total weight of the calcined material.

*Catalyst 8.*—A tungsten-containing solution was prepared by dissolving 2.2 grams of ammonium metatungstate in 150 ml. of deionized water. This solution was mixed 5–10 minutes at 90–100° F. with 250 grams of catalyst 6 wet gel. The mixture was dried over the weekend at 212° F. in air in a vacuum oven and calcined 3 hours at 1100° F. It contained about 3 weight percent tungsten based on the total weight of the calcined material.

The above catalysts were tested in a butene-2 dehydrogenation process as set forth in Example I, and butene conversion and selectivity, both in mols per 100 mols of butene-2 in the feed were determined after ¼, 1 and 3 hours on stream. These data set forth the results of these runs as follows:

TABLE III

| Catalyst | Composition, wt. percent based on final catalyst | | ¼ hour | | 1 hour | | 3 hours | |
| --- | --- | --- | --- | --- | --- | --- | --- | --- |
| | Group VI-B metal | Phosphorus | Conv. | Selec. | Conv. | Selec. | Conv. | Selec. |
| 6 | | 7.7 | 98 | 91 | 88 | 86 | 76 | 86 |
| 7 | 1 (Mo) | 7.7 | 100 | 85 | 97 | 83 | 94 | 82 |
| 8 | 3 (W) | 7.7 | 100 | 83 | 96 | 87 | 90 | 76 |

The above data show that after three hours on stream the catalysts promoted with molybdenum and tungsten, i.e., catalysts 7 and 8, respectively, maintained a higher catalytic activity than the unpromoted catalyst.

Reasonable variations and modifications are possible within the scope of this disclosure without departing from the spirit and scope thereof.

We claim:
1. An oxidative dehydrogenation catalyst consisting essentially of that formed by combining under dehydrogenation catalyst forming conditions effective catalyst forming amounts of (1) at least one phosphorus-containing compound selected from ammonium and Group I–A and II–A metal phosphates, phosphorus pentoxide, and phosphoric acid, (2) at least one tin-containing compound, and (3) at least one of chromium, molybdenum, and tungsten, and compounds containing chromium, molybdenum, and tungsten, at least one of said (1), (2) and (3) materials contains oxygen, none of said materials being deleterious to dehydrogenation catalytic effects, and removing substantially all the elements in said materials other than phosphorus, tin, oxygen, chromium, molybdenum, and tungsten by violatizing by heating the catalyst at least to the temperature at which the catalyst is used in a dehydrogenation process or by washing the catalyst with a liquid that is nondeleterious to the catalytic effects of the catalyst, said (3) material being employed in amounts sufficient to add to the total catalyst from about 1 to about 10 weight percent of the (3) material, calculated as metal, based on the total weight of the final catalyst.

2. The composition according to claim 1 wherein the phosphorus-containing compound or compounds are selected from ammonium and Group I–A and II–A metal phosphates, phosphorus pentoxide, and phosphoric acid and are employed in amounts sufficient to add to the final catalyst from about 0.1 to about 16 weight percent phosphorus based on the total weight of the final catalyst, the tin compound or compounds are tin halide, tin sulfate, tin acetate, tin oxide, tin tartrate, and tin nitrate, and are employed in an amount sufficient to add to the final catalyst from about 15 to about 75 weight percent tin based on the total weight of the final catalyst, and the chromium, molybdenum, and tungsten compounds are nitrates, halides, sulfates, oxylates, acetates, carbonates, propionates, tartrates, bromates, chlorates, oxides, and hydroxides of those metals.

3. The composition according to claim 1 wherein said catalyst is formed from the combination of phosphoric acid, stannic chloride, and one of ammonium molybdate, ammonium tungstate, and chromium nitrate, wherein the combining of these materials is carried out by mixing same for from about 1 minute to about 5 hours at from about ambient to about 200° F.

4. The composition according to claim 3 wherein said amonium molybdate is ammonium meta-molybdate, said ammonium tungstate is ammonium meta-tungstate, and said chromium nitrate is chromic nitrate.

5. In a dehydrogenation process which a tin-phosphorus catalyst, the improvement comprising employing a dehydrogenation catalytic amount of the catalyst of claim 1.

6. A method according to claim 5 wherein the catalyst employed has a composition wherein the phosphorus-containing compound or compounds are selected from ammonium and Group I–A and II–A metal phosphates, phosphorus pentoxide, and phosphoric acid and are employed in amounts sufficient to add to the final catalyst from about 0.1 to about 16 weight percent phosphorus based on the total weight of the final catalyst, the tin compound or compounds are tin halide, tin sulfate, tin acetate, tin oxide, tin tartrate, and tin nitrite, and are employed in an amount sufficient to add to the final catalyst from about 15 to about 75 weight percent tin based on the total weight of the final catalyst, and the chromium, molybdenum, and tungsten compounds are nitrates, halides, sulfates, oxylates, acetates, carbonates, propionates, tartrates, bromates, chlorates, oxides, and hydroxides of those metals and the dehydrogenation process is carried out using a temperature of from about 700° F. to about 1300° F., a pressure of from about 0.05 to about 250 p.s.i.a., an oxygen to gaseous dehydrogenation feed volume ratio of from 0.1/1 to about 3/1, and a dehydrogenation feed space rate in volumes of dehydrogenation feed vapor per volume of catalyst per hour at 32° F., and 15 p.s.i.a. of from about 50 to about 5000.

7. The method according to claim 5 wherein said catalyst is formed from a combination of phosphoric acid, tin halide and a compound selected from the group consisting of chromium, molybdenum, tungsten, and nitrates, halides, sulfates, oxylates, acetates, carbonates, propionates, tartrates, bromates, chlorates, oxides, and hydroxides of chromium, molybdenum, and tungsten, and the catalyst is used to oxidatively dehydrogenate at least one butene to butadiene.

8. The method according to claim 5 wherein the catalyst employed is formed from the combination of phosphoric acid, stannic chloride, and one of ammonium molybdate, ammonium tungstate, and chromium nitrate, wherein the combining of these materials is carried out by mixing same for from about 1 minute to about 5 hours at from about ambient to about 200° F.

9. The method according to claim 8 wherein said ammonium molybdate is ammonium meta-molybdate, said ammonium tungstate is ammonium meta-tungstate, and said chromium nitrate is chromic nitrate.

10. The method according to claim 5 wherein steam is employed in a volume ratio of steam to organic compound feed of from about 0.1/1 to about 50/1.

References Cited

UNITED STATES PATENTS

| | | | |
|---|---|---|---|
| 3,135,807 | 6/1964 | Grasselli et al. | 252—437 X |
| 3,161,670 | 12/1964 | Adams et al. | 260—680 X |
| 3,274,283 | 9/1966 | Bethell | 260—680 |
| 3,324,166 | 6/1967 | Sennewald et al. | 252—437 X |
| 3,326,961 | 6/1967 | Eden et al. | 252—437 X |
| 3,320,331 | 5/1967 | Gaspar et al. | 260—683.3 |

PAUL M. COUGHLAN, Jr., Primary Examiner

U.S. Cl. X.R.

252—437; 260—696